United States Patent [19]
Iwamura

[11] Patent Number: 5,883,621
[45] Date of Patent: *Mar. 16, 1999

[54] DEVICE CONTROL WITH TOPOLOGY MAP IN A DIGITAL NETWORK

[75] Inventor: Ryuichi Iwamura, San diego, Calif.

[73] Assignees: Sony Corporation, Tokyo, Japan; Sony Electronics, Inc., Park Ridge, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 664,445

[22] Filed: Jun. 21, 1996

[51] Int. Cl.$^6$ ..................................... G06F 15/00
[52] U.S. Cl. .......................... 345/327; 345/339; 345/348; 345/969
[58] Field of Search ..................................... 395/329, 339, 395/340, 342, 348, 349, 352, 356, 357, 970, 969; 345/329, 969, 970, 327, 339, 348, 356

[56] References Cited

U.S. PATENT DOCUMENTS

| | | | |
|---|---|---|---|
| 5,021,976 | 6/1991 | Wexelblat et al. | 345/356 |
| 5,226,120 | 7/1993 | Brown et al. | 395/200.54 |
| 5,261,044 | 11/1993 | Dev et al. | 345/348 |
| 5,353,399 | 10/1994 | Kuwamoto et al. | 345/349 |
| 5,504,863 | 4/1996 | Yoshida | 395/184.01 |
| 5,548,722 | 8/1996 | Jalalian et al. | 395/200.5 |

OTHER PUBLICATIONS

Response to EIA R4.1 Committee Request for Proposals for Baseband Digital Interface, Sony Corporation, Texas Instruments,Inc., Thursday, Aug. 31, 1995.

P1394 Standard for a High Performance Serial Bus, Copyright©1995 by The Instutute of Electrical And Electronic Engineers, Inc., P 1394 Draft 8..0v3, Oct. 15, 1995.

Primary Examiner—BA Huynh
Attorney, Agent, or Firm—Blakely, Sokoloff, Taylor & Zafman LLP

[57] ABSTRACT

A topology map for a digital system is generated and displayed on a display device to indicate the various components which make up the system. The various components are indicated using icons each of which represent a respective one of the components. A user specifies a source device and a receive device by manipulating the corresponding icons so as to cause a data transfer between the source device and the receive device. The data transfer may include the transfer of video data, audio data, or both. In a preferred embodiment, the digital network corresponds to the IEEE 1394 Serial Bus Standard.

15 Claims, 14 Drawing Sheets

| 10 | phy_ID | o | L | gap_cnt | sp | del | c | pwr | p0 | p1 | p2 | i | m |
|----|--------|---|---|---------|----|----|---|-----|----|----|----|----|---| logical inverse of first quadlet p0, p1, p2 = port status

Fig. 4

| phy_ID | Device name | port1 | port2 | port3 |
|---|---|---|---|---|
| 00 | DVD | parent 504 | unconn | unconn 502 |
| 01 | MD | unconn | parent | noport 506 |
| 02 | DVCR2 | parent 512 | noport | noport 511 |
| 03 | DVCR1 | parent | child 510 | child 508 |
| 04 | IRD | child | child | noport |

| phy_ID | Device name | port1 | port2 | port3 |
|---|---|---|---|---|
| 00 | DVD | phy_ID:04 port1 | unconn | unconn |
| 01 | MD | unconn | phy_ID:03 port2 | noport |
| 02 | DVCR2 | phy_ID:03 port3 _812_ | noport | noport |
| 03 | DVCR1 | phy_ID:04 port2 | phy_ID:01 port2 | phy_ID:02 port1 _808_ |
| 04 | IRD | phy_ID:00 port1 | phy_ID:03 port1 | noport |

DEVICE CONTROL WITH TOPOLOGY MAP IN A DIGITAL NETWORK

FIELD OF THE INVENTION

The present invention is related to the field of graphical user interfaces and, more particularly, to device control using a topology map displayed as part of such an interface.

BACKGROUND

The components of a computer system are typically coupled to a common bus for communicating information to one another. Various bus architectures are known in the prior art, and each bus architecture operates according to a communications protocol that defines the manner in which data transfer between components is accomplished.

The Institute of Electrical and Electronic Engineers (IEEE) has promulgated a number of different bus architecture standards including IEEE standards document 1394, entitled *Standard for a High Performance Serial Bus* (hereinafter "IEEE 1394 Serial Bus Standard"). A typical serial bus having the IEEE 1394 standard architecture is comprised of a multiplicity of nodes that are interconnected via point-to-point links, such as cables, that each connect a single node of the serial bus to another node of the serial bus. Data packets are propagated throughout the serial bus using a number of point-to-point transactions, wherein a node that receives a packet from another node via a first point-to-point link retransmits the received packet via other point-to-point links. A tree network configuration and associated packet handling protocol ensures that each node receives every packet once. The serial bus of the IEEE 1394 Serial Bus Standard may be used as an alternate bus for the parallel backplane of a computer system, as a low cost peripheral bus, or as a bus bridge between architecturally compatible buses.

A communications protocol of the IEEE 1394 Serial Bus Standard specifies two primary types of bus access: asynchronous access and isochronous access. Asynchronous access may be either "fair" or "cycle master". Cycle master access is used by nodes that need the next available opportunity to transfer data. Isochronous access is used by nodes that require guaranteed bandwidth, for example, nodes transmitting video data. The transactions for each type of bus access are comprised of at least one "subaction", wherein a subaction is a complete one-way transfer operation.

In existing analog or digital networks, a user is not provided with a graphical presentation of information regarding the network, including the type of devices which make up the network, the manner in which the devices are interconnected connected and the signal flow which occurs between the various devices. Where the network in question is an analog audio/video system, a signal selector and complicated "spaghetti connections" are unavoidable when a user wishes to dub signals freely between the devices in the network.

It would, therefore, be desirable to have an apparatus and a method for displaying the topology of a network as part of a graphical user interface so as to provide a means for a user to operate and control the devices in the network.

SUMMARY OF THE INVENTION

Accordingly, in one embodiment, a topology map for a digital system is generated and displayed on a display device to indicate the various components which make up the system. The various components are indicated using icons, each of which represent a respective one of the components. A user specifies a source device and a receive device by manipulating the corresponding icons so as to cause a data transfer between the source device and the receive device. The data transfer may include the transfer of video data, audio data, or both. In a preferred embodiment, the digital network corresponds to the IEEE 1394 Serial Bus Standard.

There are many advantages provided by the present invention. For example, a user may view a connection map or an exact topology map for the digital system on the display device. Additionally, a user may control data transfer in the digital network by clicking icons or selecting commands from pop-up menus associated with the various components which make up the network. By using the graphical user interface in this way, remote control of the various components of the digital network is provided. Further, a user may understand signal flows within the network and can also view information associated with each of the devices in the network by viewing the topology map displayed on the display device.

These and other features and advantages of the present invention will be apparent to those skilled in the art upon review of the detailed description and accompanying drawings which follow.

BRIEF DESCRIPTION OF THE DRAWINGS

The present invention is illustrated by way of example and not limitation in the figures of the accompanying drawings in which:

FIG. 4 illustrates an exemplary self identification packet format;

FIG. 5 illustrates a self identification packet table of the network shown in FIG. 1;

FIG. 9 illustrates a modified packet table of the network shown in FIG. 1;

DETAILED DESCRIPTION

A method and an apparatus for providing device control with a topology map in a digital network are disclosed. The present invention is applicable to any digital network which is capable of providing topology information. A digital network corresponding to the IEEE 1394 Serial Bus Standard will be described herein as an exemplary digital network within which the methods and apparatus of the present invention operate.

In the following detailed description, the terms "topology map" and "connection map" have different meanings. A topology map represents the exact topology of a network and indicates the interconnections between network devices. In contrast, a connection map includes device icons or names, but does not necessarily represent the exact topology of a digital network. Further distinctions between these terms will be apparent from a review of this entire specification. A connection map is sufficient for the purposes of the present invention as a user need not necessarily know the exact topology of a network in order to operate the devices which make up the network. The use of a topology map as described below is, therefore, optional.

Figure 1:
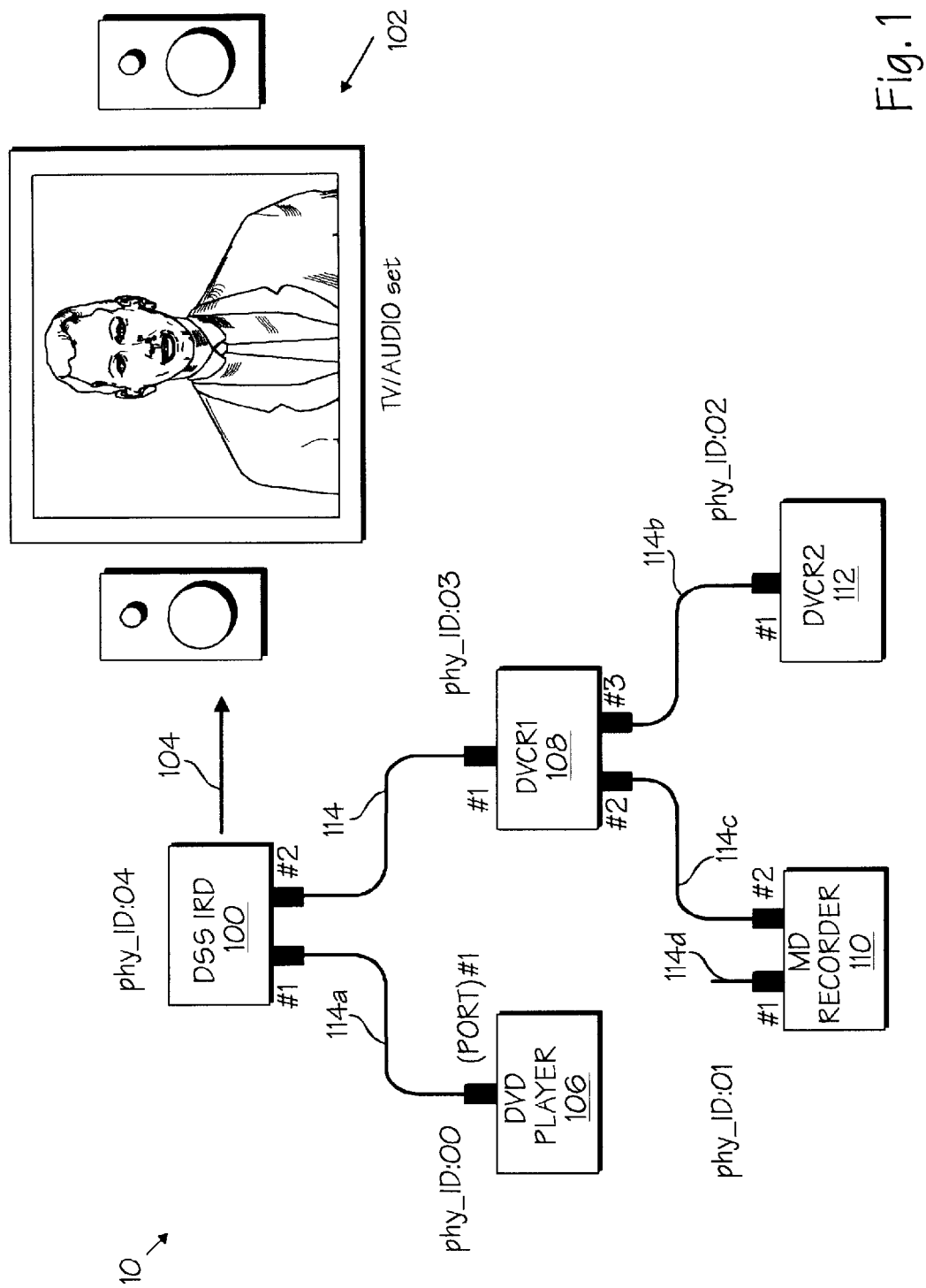
FIG. 1 illustrates a digital network according to one embodiment.

FIG. 1 illustrates a digital network 10. Network 10 corresponds to the IEEE 1394 Serial Bus Standard. A digital satellite system integrated receiver decoder (DSS IRD) 100 is connected to TV (television)/audio set 102 with an analog cable 104. In one embodiment, IRD 100 may obtain topology information and generate a map from the topology information. In an alternate embodiment, TV/audio set 102 may obtain the topology information and generate a map from that information if TV/audio set 102 has IEEE 1394 Serial Bus Standard interface capability and is connected to network 10. IRD 100 is also coupled to various devices in network 10 including digital video disc (DVD) player 106, digital video cassette recorder 1 (DVCR1) 108, mini-disc (MD) recorder 110 and DVCR2 112.

Those skilled in the art will appreciate that each of the devices 100, 106, 108, 110, 112 of the network 10 is associated with a corresponding node of the serial bus. In general, the device to which a node is coupled acts as the "local host" for that node. For example, the DSS IRD 100 is the local host for the DSS IRD node; the DVD player 106 is the local host for the DVD node; DVCR1 108 is the local host for the DVCR1 node; the MD recorder 110 is the local host for the MD recorder node; and DVCR2 112 is the local host for the DVCR2 node. It is not necessary for every node to have a local host, nor is it necessary that the local host always be powered.

A point-to-point link such as cable 114 is used to connect two nodes to one another. The DSS IRD node is coupled to the DVCR1 node by cable 114 and to the DVD node by cable 114a. The DVCR1 node is coupled to the MD recorder node by cable 114c and to the DVCR2 node by cable 114b. The MD recorder node is capable of being coupled to other peripherals (not shown) by cable 114d. Each of the cables 114–114d may be constructed in accordance with the IEEE 1394 Serial Bus Standard and may include a first differential signal pair for conducting a first signal, a second differential signal pair for conducting a second signal, and a pair of power lines.

Each of the nodes may have identical construction, although some of the nodes can be simplified because of their specific functions. Thus, the nodes can be modified to meet the needs of the particular local host. Each node has one or more ports, the number of which is dependent upon its needs. For example, the DSS IRD node, as illustrated, has two ports, while the DVD player node has only one port.

Figure 2A:
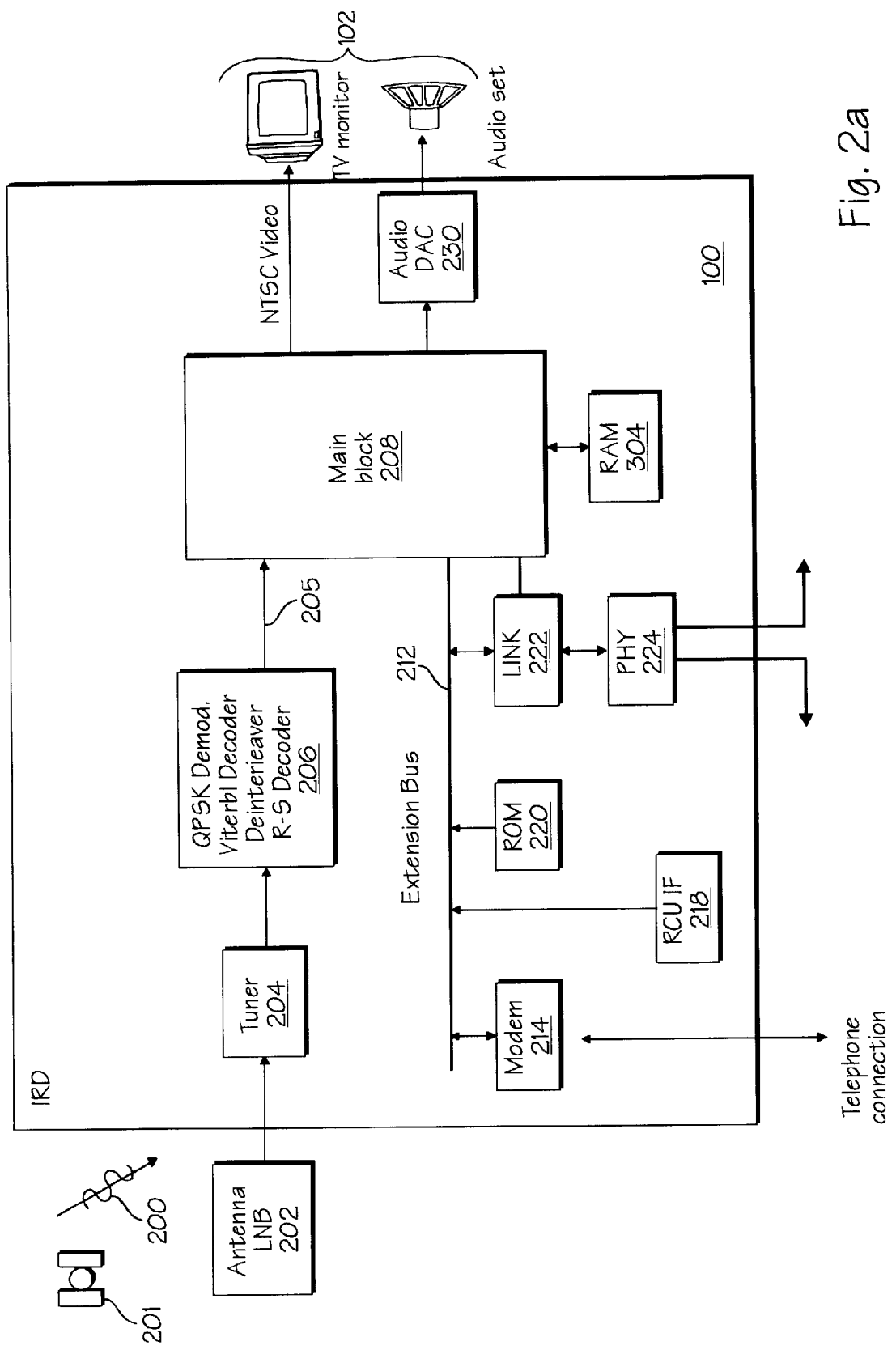
FIG. 2a illustrates an integrated receiver decoder (IRD) configured according to one embodiment.

FIG. 2a further illustrates the DSS IRD 100. Antenna 202 receives a signal 200 from a satellite 201. Signal 200 is amplified in a low noise block (LNB) and transmitted to tuner 204. Those skilled in the art will appreciate that the signal transmitted to tuner 204 comprises a number of individual channels. In tuner 204, the desired channel from signal 200 is selected for processing and passed to demodulator 206. In demodulator 206, the pre-selected channel is QPSK-demodulated, viterbi-decoded, de-interleaved and Reed-Solomon decoded. The decoded signal 205 is then passed to main block 208 for further processing.

Figure 2B:
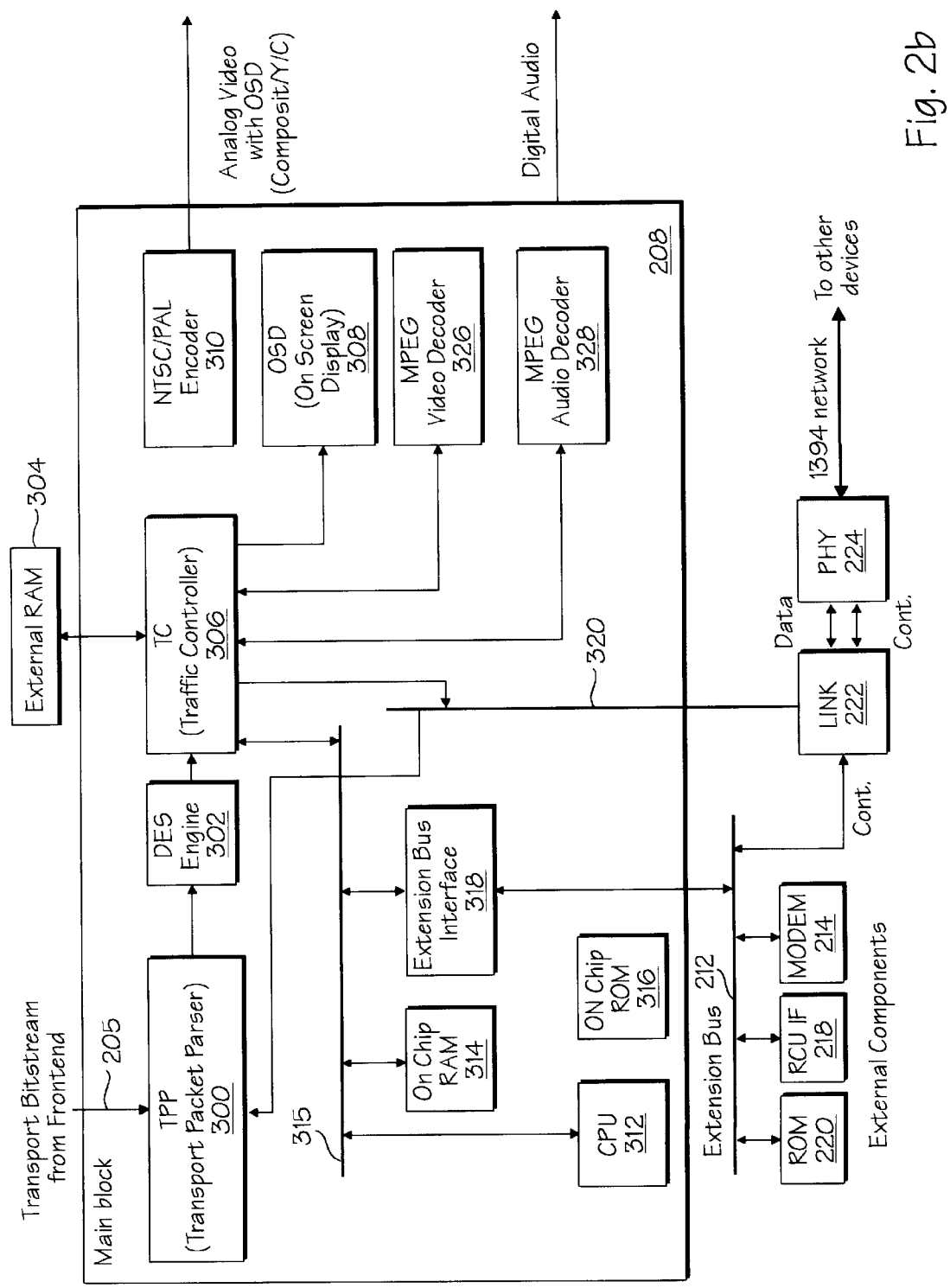
FIG. 2b illustrates the main block of the integrated receiver decoder.

Main block 208 is further illustrated in FIG. 2b. As shown, decoded signal 205 is first parsed in Transport Packet Parser (TPP) 300 and then decrypted in DES engine 302. The resulting signal is then stored in an external RAM 304 under the control of traffic controller (TC) 306.

In response to signals from central processing unit (CPU) 312, the stored signal is retrieved from external RAM 304 and transmitted via traffic controller 306 to either MPEG video decoder 326 or MPEG audio decoder 328, as appropriate. The output signal from video decoder 326 is mixed with on-screen display (OSD) data 308 and converted to NTSC or PAL analog signals by NTSC/PAL encoder 310 and transmitted to TV/audio set 102. Digital audio signals are transmitted from the Audio Decoder 328 to Audio DAC 230 and converted to analog signals. The analog signals are then transmitted to TV/audio set 102.

Central processing unit (CPU) 312 controls all of the above processes. CPU 312 communicates with on-chip RAM 314, ROM 316, extension bus 212 and traffic controller 306 through an internal high speed bus 315. CPU 312 also communicates to ROM 220, modem 214 and remote command unit interface (RCU-IF) 218 through extension bus interface 318 and extension bus 212. RCU-IF 218 receives commands from a remote control unit (RCU) (not shown) and transmits them to CPU 312 via extension bus 212. Link layer IC (LINK) 222 and physical layer IC (PHY) 224 communicate with CPU 312 through extension interface bus 318 and extension bus 212. PHY 224 is coupled to LINK 222 via data and control lines and to other nodes of the IEEE 1394 Serial Bus as indicated.

LINK 222 and PHY 224 make up the IEEE 1394 Serial Bus interface for DSS IRD 100. All 1394 commands transmitted by CPU 312 are transferred to LINK 222 through extension bus 212. The 1394 commands are sent via PHY 224 and are ultimately transmitted to a destination node in the network 10. The commands from other devices in network 10 are received by PHY 224 and transmitted to LINK 222. LINK 222 transfers these commands to CPU 312 through extension bus 212. Audio-video data is transferred between DSS IRD 100 and LINK 222 through 1394 data bus 320. When DSS IRD 100 sends data, TC 306 transfers the data from external RAM 304 or DES engine 302 to LINK 222. When IRD 100 receives data, LINK 222 sends the data to TPP 300 via 1394 data bus 320.

Figure 3:
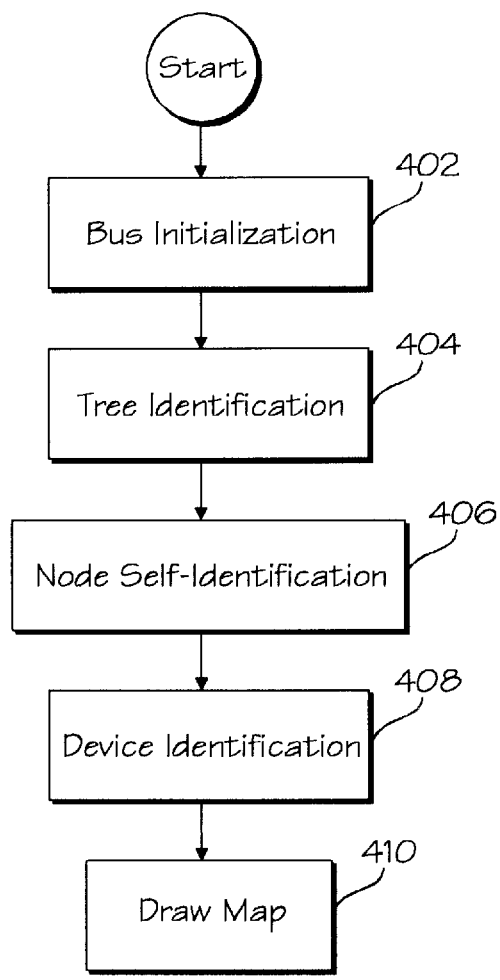
FIG. 3 is a flow diagram illustrating the process of generating a topology map according to one embodiment.

FIG. 3 is a flow diagram illustrating the general steps followed by the present invention in constructing a topology map. There are several steps followed in configuring a cable environment, namely, bus initialization, self identification and device identification. In step 402, bus initialization is performed. Upon start up and again whenever a new node joins network 10, a reset signal forces all nodes in network 10 into a special state which clears all topology information and starts the next phase. During the bus initialization phase, PHY 224 internally latches the connection status of each port. PHY 224 will automatically initiate the bus initialization phase if the connection status of any port changes, for example, where an adjacent device is removed or added. In 1394 parlance, nodes with no connected ports are isolated. Nodes with a single connected port are leaves (or children) and nodes with two or more connected ports are branches (or parents). The eventual root node may be either a branch or a leaf.

In step 404, the tree identification phase is performed. During this phase, a tree identification process translates the general network topology into a tree where one node is designated as the root node and all of the physical connections have a direction associated with them pointing towards the root node. Each connected port of each node may be labeled as a parent port (connected to a node closer to the root) or as a child port (connected to a node further from the root). The unconnected ports are labeled "off" and do not participate further in the arbitration process. The tree identification process is well known in the art.

In step 406, to give each node an opportunity to select unique physical identification and identify itself to any management identity attached to the bus, the self identification phase is performed. This phase allows low level power management and the building of the system topology map. This process is also well known in the art. During the self identification process, all nodes identify themselves to all other nodes. An exemplary self identification packet format is illustrated in FIG. 4.

During self-identification step 406, each node receives a self identification packet from all the nodes in the network 10. CPU 312 in DSS IRD 100 receives these packets from LINK 222 and stores portions of the information them in a self identification packet table in external RAM 304. Only the physical identification (PHY-ID) and port status bits of each self identification packet are needed to construct a map in accordance with the present invention.

FIG. 5 illustrates an exemplary self identification packet table 500 for the network 10 shown in FIG. 1. In the table 500, the term "parent" identifies a parent node, that is a node which has a port status of 10 (see FIG. 4, indicating the port status bits p1, p2, etc.). The term "child" identifies a child node, i.e., a node which has a port status of 11, the term "UNCONN" indicates that the particular port is not connected to any other PHY and the port status is 01, and finally, the term "NOPORT" indicates that the particular port is not present on this particular PHY and the port status is 00. The device name column of table 500 is filled in during step 408.

Returning to FIG. 3, step 408, after the self identification process, a device identification process is performed. During this process 408, DSS IRD 100 sends commands to all the nodes and inquires as to their respective device types. Device type information may be stored in and returned from a configuration ROM associated with each node of the serial bus as is known in the art.

According to the responses from the nodes, DSS IRD 100 associates unique device names to the nodes automatically. For example, a DVCR will be named "DVCR". If multiple DVCRs are connected, a suffix will be attached to each of the device names as follows: DVCR1, DVCR2, etc.

As the responses are received, the device name column of table 500 is filled in appropriately as shown in FIG. 5. Instead of DSS IRD 100 automatically assigning the device names, a user may also give the devices preferred names.

In step 410 of FIG. 3, each device is represented as an icon or a name on the map to be constructed. To construct the map, CPU 312 of DSS IRD 100 executes commands so as to place each icon suitably linked to other icons on the display (i.e., the TV screen or other display device).

Figure 6:
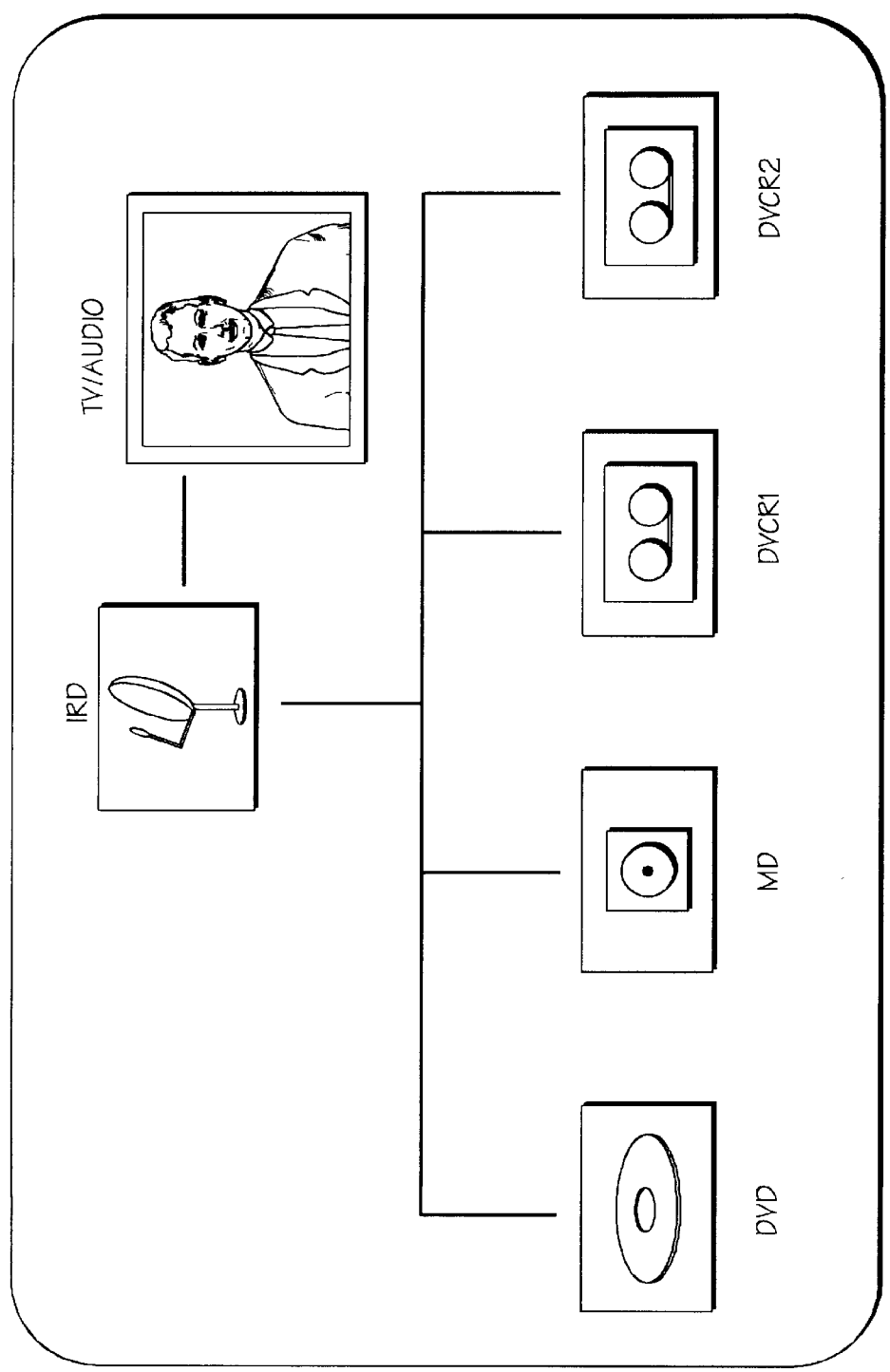
FIG. 6 illustrates an exemplary connection map of the network illustrated in FIG. 1.
Figure 7:
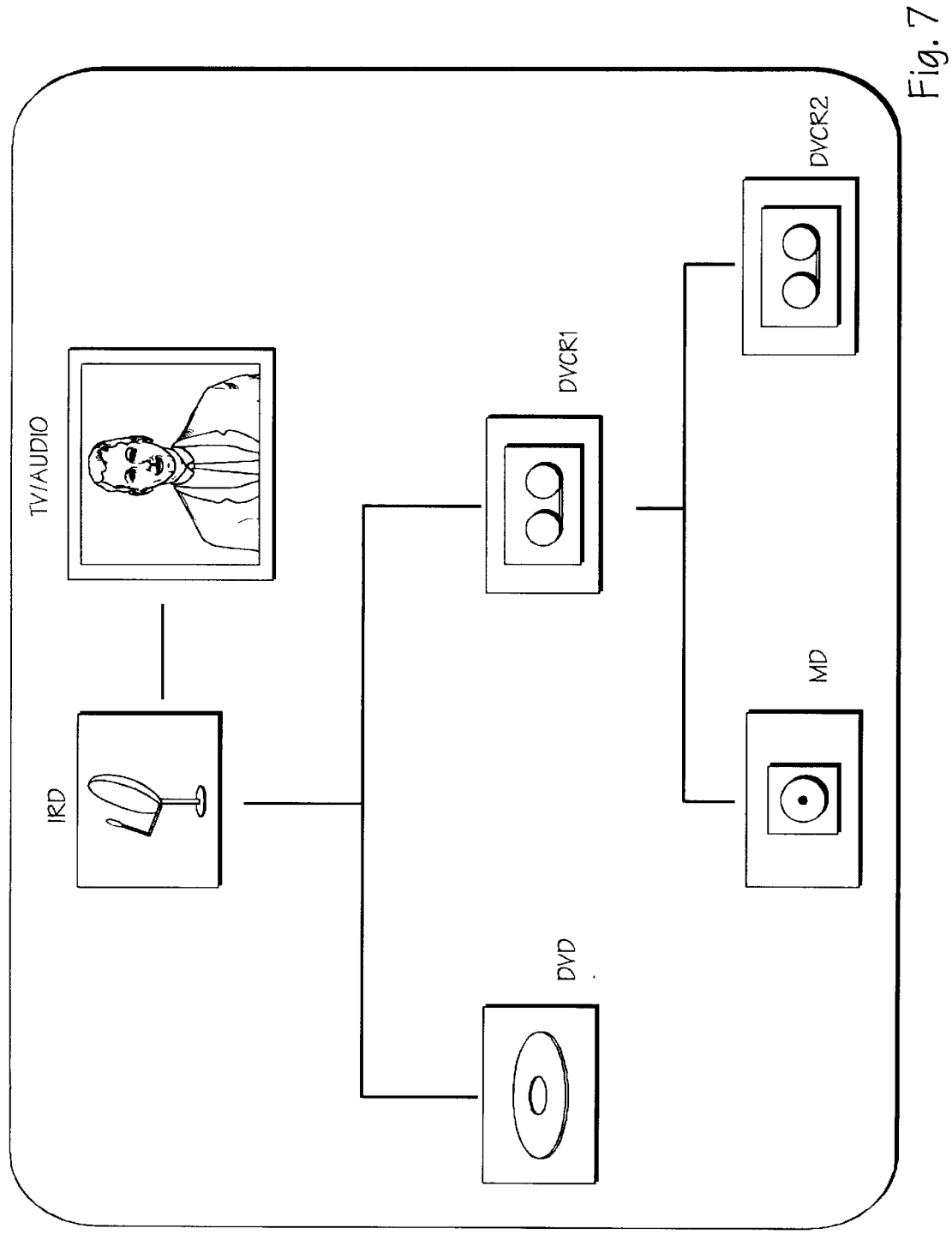
FIG. 7 illustrates an exemplary topology map of the network illustrated in FIG. 1.

FIG. 6 illustrates an exemplary connection map of the network 10 illustrated in FIG. 1. In the case of a topology map (in contrast with a connection map), CPU 312 of IRD 100 must construct the exact topology using the physical identifications and port status information stored in table 500. FIG. 7 illustrates an exemplary topology map of the network 10 illustrated in FIG. 1.

The graphical displays shown in FIGS. 6 and 7 illustrate the use of icons to represent the various components of network 10. The icons are displayed using programming techniques well known in the art and, as discussed further below, provide a user with a graphical interface by which the user can control the operation of the various devices. It will be appreciated that the graphical illustrations for the various devices could be any of a number of fanciful illustrations. In addition, simple text could be used in place of the graphical illustrations. Where graphical icons are used, the icons may be animated. For example, when DVCR1 is operating, the icon representing DVCR1 may depict movement of the video tape which is shown on the graphical icon.

Figure 8:
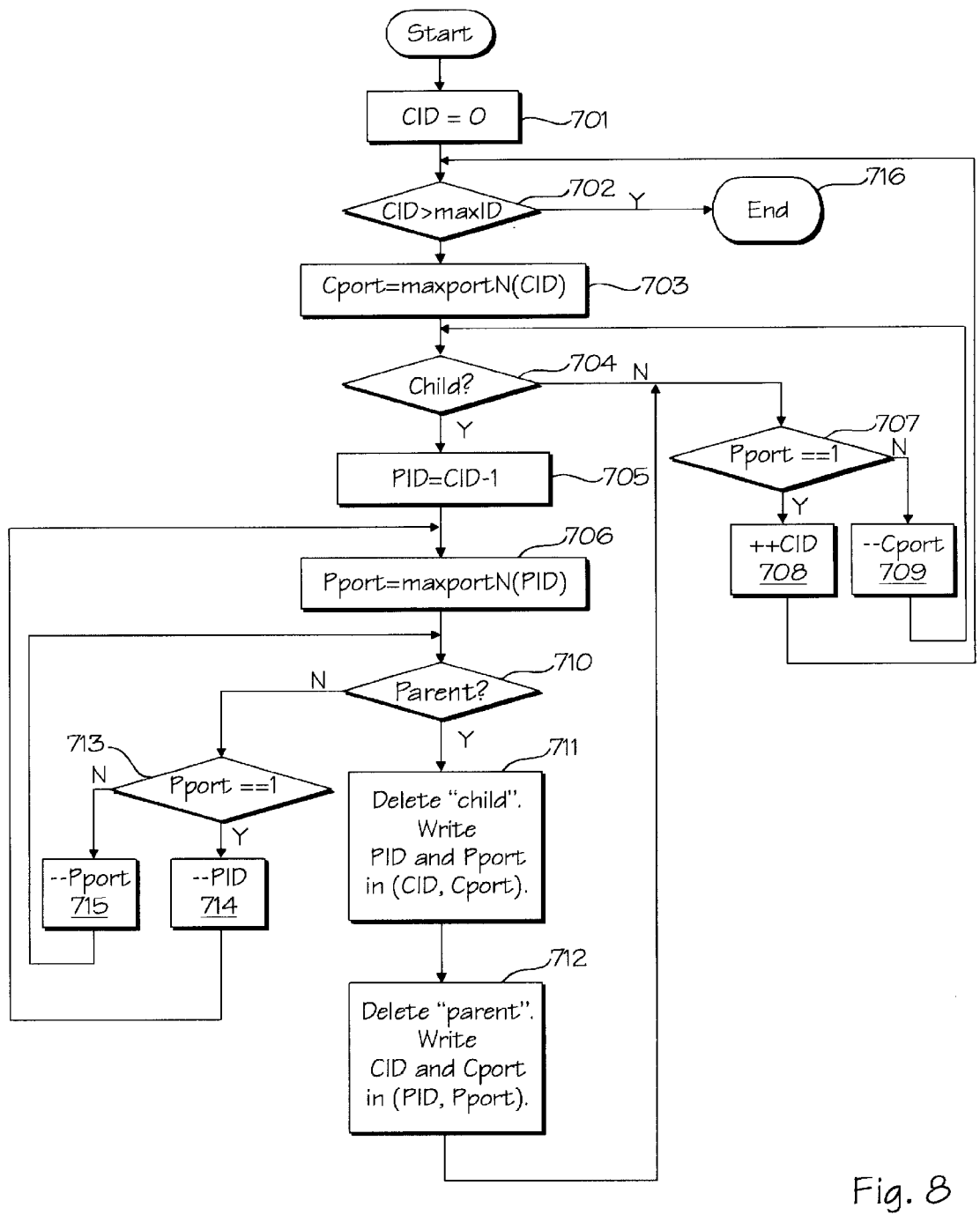
FIG. 8 is a flow diagram illustrating the process of constructing a topology map.

FIG. 8, is a flow diagram illustrating the general steps followed by CPU 312 in modifying table 500 of FIG. 5 in order to construct a topology map for display. In step 701, child identification counter CID is initialized to 0. At step 702, counter CID is tested to determine whether it has exceeded the maximum physical ID (phy_ID) value for the table 500. In this example, the nodes of network 10 have phy_ID values of 00 (DVD player 106), 01 (MD recorder 110), 02 (DVCR2 112), 03 (DVCR1 108), and 04 (DSS IRD 100). The phy_ID values are derived from the node self-identification packets transmitted during the self-identification process discussed above. If the CID counter exceeds the maximum phy_ID value, all of the cells of table 500 have been tested, as described below, and the process ends at step 716.

At step 703, a second counter, Cport, is set to the maximum port number for table 500. In this example, the maximum port number is 3, however, those skilled in the art will appreciate that the maximum port number may vary depending upon the configuration of network 10 and the nodes comprising same. The two counters, CID, and Cport, are used as place holders to define a cell-by-cell search of table 500.

The search begins at step 704 where a test of the cell defined by CID and Cport is conducted. For the present example, the first cell tested is cell 502. This is because CID is set to 0 initially and Cport is set to 3 initially. CID represents the row of table 500 to be searched and Cport represents the column to be searched. The intersection of the row defined by CID and the column defined by Cport defines the cell to be tested at step 704. The test of step 704 determines whether the current cell is a "child" cell. That is, the test determines whether the port, defined by Cport, of the node, defined by phy_ID or CID, is a child port. For the first cell 502, the test will result in a negative condition and the process moves to step 707.

At step 707, a check is made to determine whether a cell in column 1, e.g., cell 504, is under test. If not, the process moves to step 709 and the counter Cport is decremented. If, however, the current cell under test is in column 1, the counter CID is incremented. In this way, cells of table 500 are tested by moving across a row, defined by CID, from maximum port number to minimum port number. After the cell in column 1 of the row of interest is tested, the process selects the cell in column 3 of the next highest CID row for testing. So, after cell 504 is tested, cell 506 is tested next. This process continues until a child cell is found at step 704. It is apparent that cell 508 will be the first such child cell found. Cell 508 represents port number 3 of DVCR1.

When a child cell of table 500 has been found, the process moves to step 705 and a third counter, PID, is set equal to the current value of CID minus 1. Thus, when cell 508 is found, PID will be set equal to 2 (CID=3−1).

Next, at step 706, a fourth counter, Pport, is set equal to the maximum port number (again, for this example the maximum port number is 3). The two counters, PID and Pport, will be used as place holders for a second search of table 500. The goal of this second search will be to find the matching "parent" cell of table 500 for the child cell found in step 704.

The search for the matching parent cell begins at step 710 where the cell defined by the current values of PID and Pport is tested. PID defines the row under test and Pport defines the column under test. So, continuing the above example, after cell 508 is identified as a child cell, PID will be set to 2 and Pport will be set to 3, thus defining cell 511. Cell 511 is tested at step 710 and determined not be a parent cell. Hence, the process moves to step 713.

At step 713, a check is made to determine if the counter Pport is currently equal to 1. If not, the process moves to step 715 and Pport is decremented by 1. If the current value of Pport is equal to 1, the process moves to step 714 and the value of PID is decremented by 1. In this way, the table 500 is searched cell-by-cell moving across each row from right-to-left and moving upwards in the table after the last cell in a row (i.e., the cell in column 1) is tested. It is apparent that a search of this type will result in cell 512 being identified as the first parent cell found.

When a parent cell is found at step 710, the process moves to step 711. At step 711, the child cell found in step 704 is modified. In particular, the term "child" is removed and in its place CPU 312 writes in the corresponding values of PID and Pport. That is, the cell is annotated with the Phy_ID and Port numbers of its corresponding parent in network 10. The process then moves to step 712 and the term "parent" is removed from the cell identified in step 710. In place of "parent", CPU 312 writes in the values of CID and Cport. That is, the cell is annotated with the Phy_ID and Port numbers of its corresponding child in network 10.

In this way, all of the parent and child cells of table 500 are modified to reflect the proper Phy_ID and port numbers of their respective child and parent nodes. The fully modified table 800 is shown in FIG. 9. Note that cell 808 of table 800 corresponds to cell 508 of table 500. Similarly, cell 812 corresponds to cell 512.

Using the information contained in table 800, CPU 312 draws in the appropriate connections between nodes so as to produce a topology map (as opposed to a connection map) on the display. That is, icons representing the various devices of network 10 are drawn in as before. However, rather than merely drawing a connection map, (which shows logical connection of various components) as shown in FIG. 6, a topology map, (which shows physical connection of various components) such as that shown in FIG. 7, can be drawn because CPU 312 now has the appropriate information in terms of Phy_ID and Port number to allow for a precise reproduction of the network's actual topology. For the network 10 of FIG. 1, a connection will be drawn in between port 1 of DVCR2 and port 3 of DVCR1. Note that cells 808 and 812 contain information which allows for such a connection to be identified. The entire topology map of FIG. 7 is drawn in in this way with the exception of the known analog connection between DSS IRD 100 and TV/audio set 102.

Figure 10:
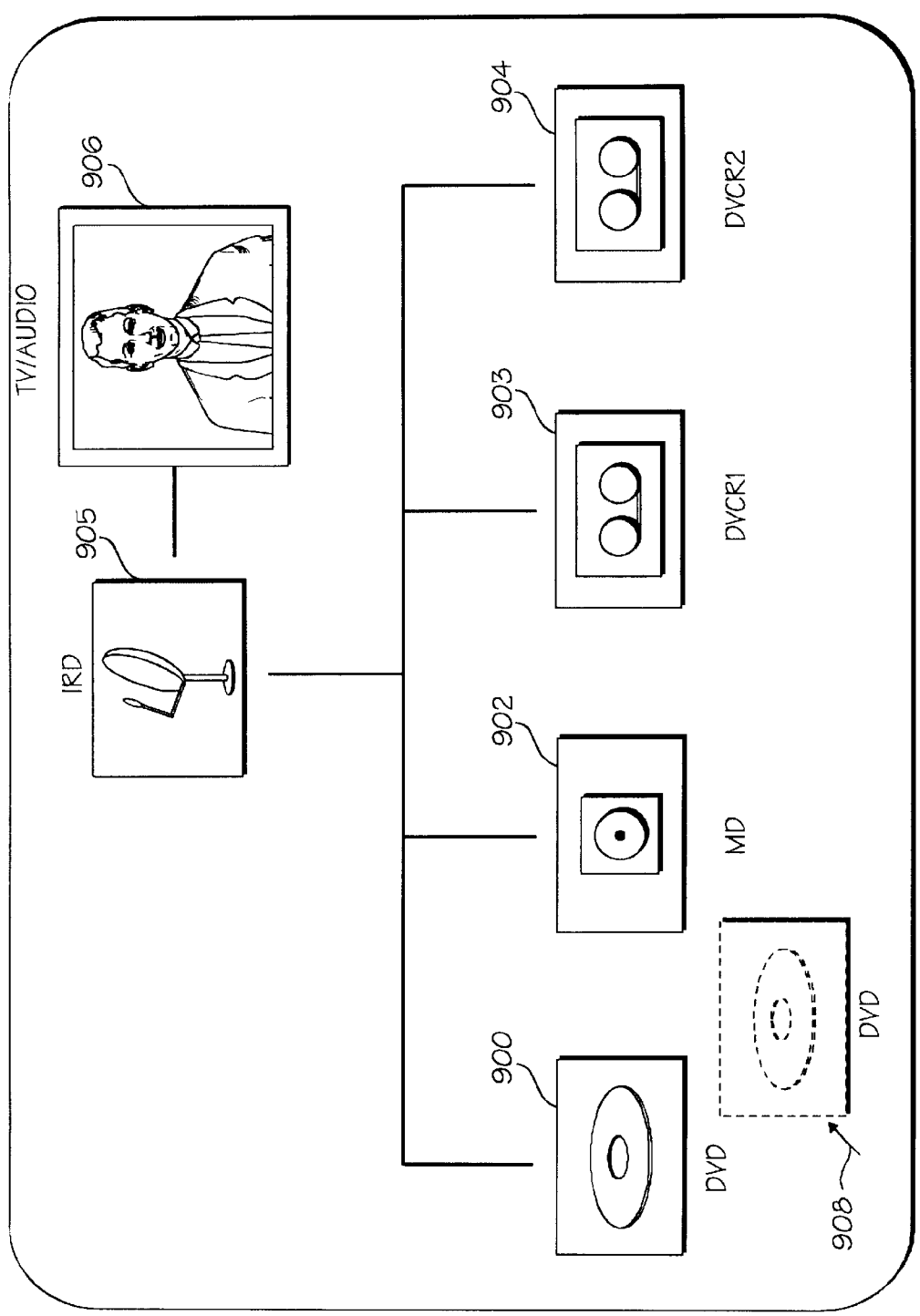
FIG. 10 illustrates an exemplary graphic user interface implementation of the present invention.
Figure 11:
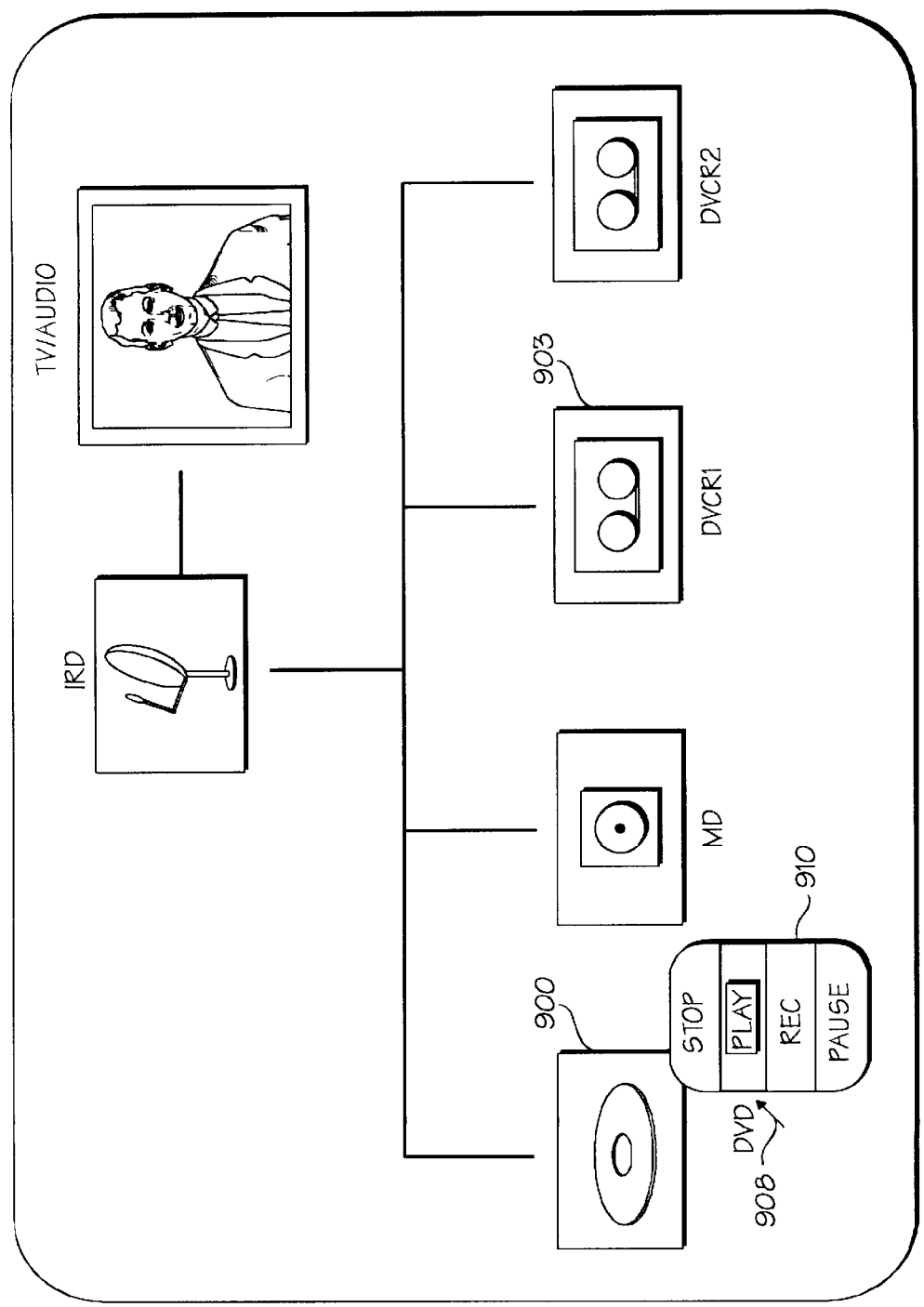
FIG. 11 illustrates a pop-up menu method of an exemplary user interface of the invention.

FIGS. 10 and 11 illustrate exemplary graphic user interfaces of the present invention. In response to a user command, CPU 312 of DSS IRD 100 constructs a connection map or a topology map as described above and stores it in external RAM 304. Hereafter, it is assumed that a connection map is used although the methods to be described are equally applicable to the use of a topology map. The map data is sent to the OSD block 308 through TC 306 and mixed with the decoded video signal. The mixed signal is converted to NTSC or PAL and sent to TV/audio set 102. The connection map can be superimposed over the television video on the TV/audio set 102.

FIG. 10 shows how a user can control the operation of network 10 devices using the connection map. Assume the user wants to record the information played out from DVD player 106 onto a videotape in DVCR1 108 and at the same time play a videotape in DVCR2 112 through DSS IRD 100 on TV/audio set 102. There are two ways to specify each source node and its corresponding receiver node.

For example, in FIG. 10, a drag and drop implementation is illustrated. A user selects the icon 900 associated with DVD player 106 and drags it toward a receiver icon using cursor 908. In the example shown, the DVD icon 900, which is highlighted, is dragged and dropped to the DVCR1 icon 903. The select and drag and drop operations are performed using a cursor control device such as an infrared remote control. In response to these operations, CPU 312 of DSS IRD 100 sends a play command to the DVD player 106. The DVD player 106 responds by beginning to play output data into the network. The CPU 312 also sends commands to DVCR1 108 to record the data from the DVD player 106. The commands are generated and transmitted through network 10 in accordance with the IEEE 1394 Serial Bus Standard.

In the same way, in order to play back data from DVCR2 112, a user drags and drops the DVCR2 icon 904 to the DSS IRD icon 905 or the TV icon 906. The DSS IRD 100 and the TV set 102 are connected by an analog cable. In the map, they are regarded as the same node. Note also that a user can specify more than one receiver device. For example, a user can record DVD signals to both DVCR1 and DVCR2 by dragging and dropping the DVD icon 900 to both DVCR1 and DVCR2 icons 903 and 904.

A second method of device control is illustrated in FIG. 11 and referred to as the pop-up menu method. When a user selects the DVD player icon 900, a pop-up menu 910 appears. If a PLAY button is selected from the pop-up menu 910 using cursor 908, the DVD player 106 begins to play. In the same way, to set DVCR1 108 to record, a user may select a REC button from a menu associated with DVCR1 icon 903. DVCR2 108 and DSS IRD 100 may be similarly controlled.

The drag and drop method illustrated in FIG. 10 is a simpler method to start recording or play back, however, complex commands such as pause, fast-forward, rewind, slow mode, etc. may be better handled by the pop-up menu method illustrated in FIG. 11.

Figure 12:
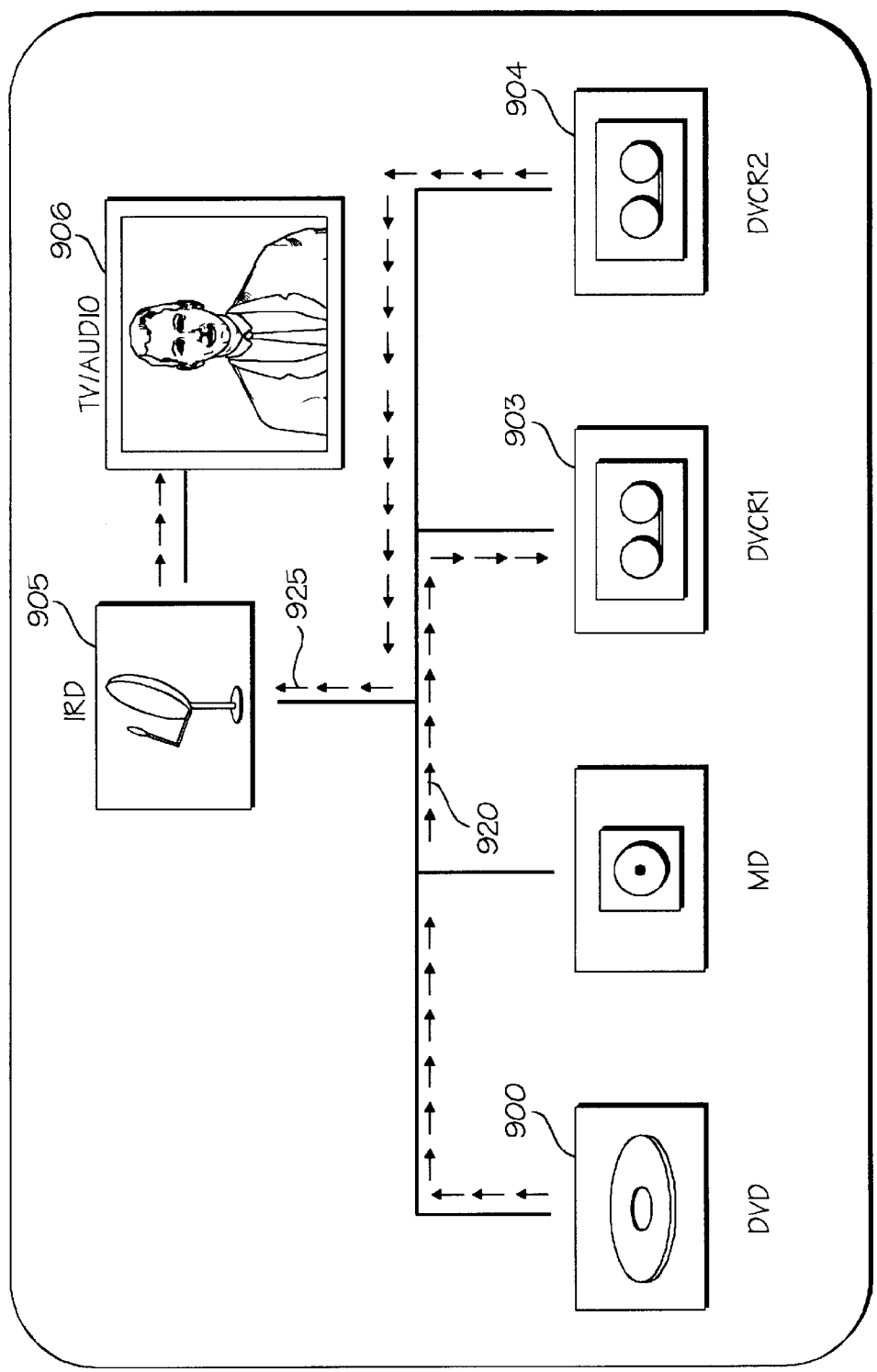
FIG. 12 illustrates the display of signal flow information between devices in a network on a graphically displayed network map.

FIG. 12 illustrates the display of signal flow information between devices in network 10 illustrated by a connection map. Signal flows are indicated with arrows 920 and 925. For one embodiment, these arrows may be different colors to indicate different information. The arrows can be animated during play and/or search and may flash on and off during a pause. If recording or playback is halted, the arrows disappear. Arrows such as 920 and 925 are implemented using programming techniques well known in the art.

Figure 13:
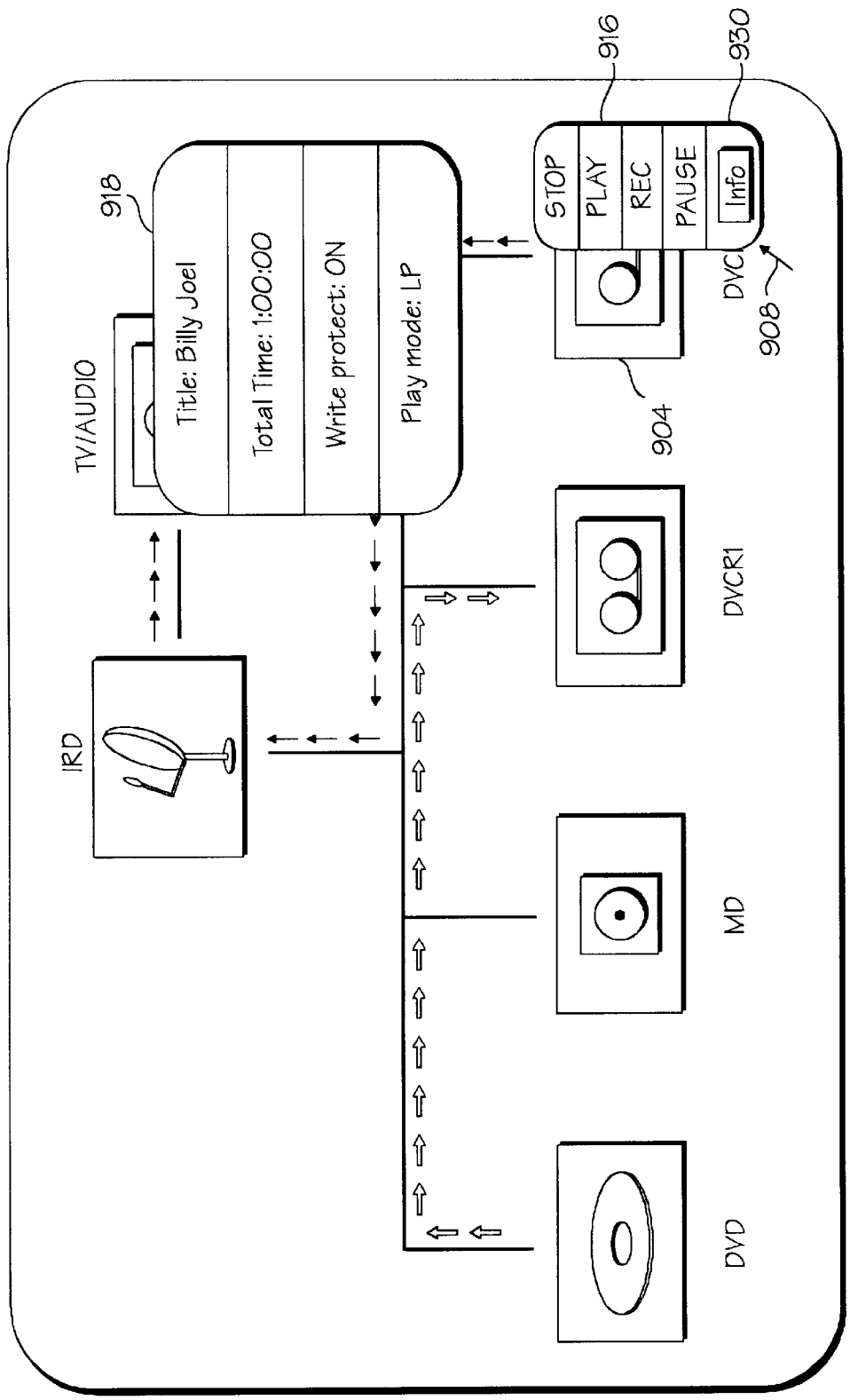
FIG. 13 illustrates the retrieval of device information from a component of an audio-video system according to one embodiment.

FIG. 13 illustrates how device information may be retrieved using the connection map implementation of the present invention. If an INFO button 930 is selected from a pop-up menu 916 associated with DVCR2 icon 904, DSS IRD 100 transmits a command to DVCR2 112 to send information regarding the video tape being played. DVCR2 112 returns the tape information. The information will then appear in a window 918 on the screen as illustrated in FIG. 13. The contents of the information window 918 depends on the device selected and its features. Examples of device information include: time (tape/disk remaining time, total playback/recording time, etc.); title (name of the loaded tape or disk); write protection (on or off); and play mode (long play or standard play).

Thus a method and apparatus for device control with a topology map on a digital network have been described. Although features and examples of the present invention have been described with reference to specific exemplary embodiments thereof, those skilled in the art will appreciate that certain modifications may be possible without departing from the broader spirit and scope of the invention which should be limited only by the claims which follow.

What is claimed is:

1. In a digital system comprising a plurality of nodes interconnected by a plurality of point-to-point links each of the nodes having an associated local host, a method of controlling the digital system comprising the steps of:

generating a network topology map for the plurality of nodes based on port status information regarding the nodes, the network topology map comprising node identification information, the network topology map being stored in a memory;

associating with the node identification information, corresponding local host identification information in a data structure in the memory;

displaying a connection map using the network topology map and the local host identification information by mixing signals representing the connection map with signals representing video information for display on a television, the connection map indicating the plurality of local hosts comprising the digital system using graphical representations of the local hosts; and controlling the operation of a first of the plurality of local hosts by manipulating a corresponding one of the graphical representations.

2. The method of claim 1 wherein the connection map further indicating physical connection paths between the plurality of local hosts.

3. The method of claim 1 wherein the connection map further indicating logical connection paths between the plurality of local hosts.

4. The method of claim 1 wherein the step of controlling comprises the steps of:

selecting the corresponding graphical representation of the first local host;

dragging and dropping the corresponding graphical representation of the first local host over a corresponding graphical representation of a second plurality of local hosts;

wherein the act of dragging and dropping initiates a digital transmission between the first local host and the second local host across the digital network.

5. The method of claim 1 wherein the step of controlling comprises the steps of:

selecting the corresponding graphical representation of the first local host;

displaying a pop-up menu associated with the first local host, the pop-up menu comprising a plurality of commands for the first local host; and selecting a first of the commands from the pop-up menu, wherein the act of selecting causes the first local host to operate in accordance with the command.

6. A method of controlling a plurality audio/video components of an audio/video system comprising the steps of:

displaying on a first of the audio/video components a connection map derived from a network topology map constructed according to port status infornation regarding the audio/video components by mixing signals representing the connection map with signals representing video information for display on a television, the connection map indicating an interconnection of each of the plurality of aadiolvideo components, the connection map comprising a plurality of graphical representations, each of the graphical representations corresponding to a respective one of the audio/video components;

manipulating a graphical representation corresponding to a selected one of the audio/video components so as to control the operation of the selected audio/video component.

7. The method of claim 6 wherein the step of manipulating comprises a drag and drop operation.

8. The method of claim 6 wherein the step of manipulating comprises the steps of:

selecting the graphical representation;

displaying, in response to the step of selecting, a pop-up menu, the pop-up menu comprising a plurality of commands, each of the commands corresponding to an associated operating state of the selected audio-video component; and selecting a first of the commands so as to cause the selected audio/video component to enter the operating state associated with the first command.

9. The method of claim 6 further comprising the step of displaying signal flow information, the signal flow information graphically representing a transfer of information within the audio/video system, the transfer corresponding to the operation of the selected audio-video component.

10. The method of claim 9 wherein the transfer of information is represented by a plurality of arrows, the arrows indicating the direction of information transfer with the audio-video system.

11. The method of claim 6 wherein the step of manipulating comprises the steps of:

selecting the graphical representation;

displaying, in response to the step of selecting, a device information window, the device information window comprising device information concerning the selected audio/video component.

12. In a digital network including a plurality of nodes interconnected by a plurality of point-to-point links, at least one of the nodes having a corresponding local host, the local host comprising:

a central processing unit (CPU) configured to generate a network topology map for the digital network in response to a first signal, the network topology map being based on port status information regarding the nodes and representing the interconnection of the plurality of nodes of the digital network;

a memory coupled to the CPU, the memory configured to store the network topology map as a data structure; and means for cornbining video signals received from a video source and representing video data for display on a television with topology signals corresponding to the network topology map received from the memory to produce a mixed signal.

13. A local host as in claim 12 wherein the means for combining comprises a video decoder coupled to receive the video signals from the video source and an on screen display mixer coupled to receive the video signals from the video decoder and to receive the topology signals from the memory.

14. A local host as in claim 12 further comprising an interface unit coupled to the CPU, the interface unit configured to generate the first signal in response to a user command.

15. A local host as in claim 14 wherein the interface unit comprises an infrared remote control receiver.

* * * * *

UNITED STATES PATENT AND TRADEMARK OFFICE
CERTIFICATE OF CORRECTION

PATENT NO. : 5,883,621
DATED : March 16, 1999
INVENTOR(S) : Ryuichi Iwamura

It is certified that error appears in the above-identified patent and that said Letters Patent is hereby corrected as shown below:

In column 10 at line 13 delete "aadiolvideo" and insert --audio/video--

Signed and Sealed this

Twelfth Day of October, 1999

Attest:

Q. TODD DICKINSON

Attesting Officer

Acting Commissioner of Patents and Trademarks